(12) United States Patent
Holin

(10) Patent No.: US 7,766,504 B1
(45) Date of Patent: Aug. 3, 2010

(54) SOLAR POWER ILLUMINATOR

(76) Inventor: Brad J. Holin, 6325 Humboldt Ave. South, Richfield, MN (US) 55423

( * ) Notice: Subject to any disclaimer, the term of this patent is extended or adjusted under 35 U.S.C. 154(b) by 279 days.

(21) Appl. No.: 12/075,627

(22) Filed: Mar. 14, 2008

Related U.S. Application Data

(60) Provisional application No. 60/921,264, filed on Apr. 2, 2007.

(51) Int. Cl.
F21L 4/02 (2006.01)

(52) U.S. Cl. .................. 362/183; 362/20; 362/178; 362/249.02

(58) Field of Classification Search .............. 362/20, 362/157, 178, 183, 184, 195, 198, 208, 230, 362/231, 234, 240, 249.01, 249.02, 249.08, 362/251, 252, 326, 334, 356, 477, 800, 806, 362/812

See application file for complete search history.

(56) References Cited

U.S. PATENT DOCUMENTS

| | | | |
|---|---|---|---|
| D231,680 S | 5/1974 | Keller | |
| 4,639,843 A | 1/1987 | Compton | |
| D288,593 S | 3/1987 | Campbell | |
| 4,999,060 A * | 3/1991 | Szekely et al. | 136/251 |
| 5,086,267 A | 2/1992 | Janda et al. | |
| 5,101,329 A * | 3/1992 | Doyle | 362/183 |
| 5,221,891 A | 6/1993 | Janda et al. | |
| 5,309,656 A * | 5/1994 | Montgomery | 40/442 |
| 5,564,816 A * | 10/1996 | Arcadia et al. | 362/183 |
| 5,630,660 A * | 5/1997 | Chen | 362/183 |
| D422,735 S | 4/2000 | Lam | |
| 6,203,170 B1 * | 3/2001 | Patrick et al. | 362/234 |
| D494,536 S | 8/2004 | Pu | |
| D522,163 S | 5/2006 | Begasse | |
| 7,196,477 B2 * | 3/2007 | Richmond | 315/149 |
| D555,281 S | 11/2007 | Quintana-Creus et al. | |
| 7,422,348 B1 * | 9/2008 | Yates, II | 362/364 |
| 2007/0091594 A1 * | 4/2007 | Soon | 362/183 |
| 2008/0013306 A1 * | 1/2008 | Guilmette | 362/183 |
| 2008/0218992 A1 * | 9/2008 | Li | 362/84 |

* cited by examiner

*Primary Examiner*—Hargobind S Sawhney
(74) *Attorney, Agent, or Firm*—Richard John Bartz

(57) ABSTRACT

A solar powered illuminator for lighting an outdoor environment has a housing joined to a platform supporting a solar panel wired to a circuit board and a rechargeable battery located within the housing. An elongated translucent tubular member joined to the housing has a passage accommodating LED lamps wired in series with electrical conductors connected to the circuit board. When solar panel is exposed to sunlight a charging current is supplied to the battery and electric power to the LED lamps is turned off. When solar panel is not exposed to sunlight the battery is disconnected from the solar panel and connected to the LED lamps to light the outdoor environment.

18 Claims, 4 Drawing Sheets

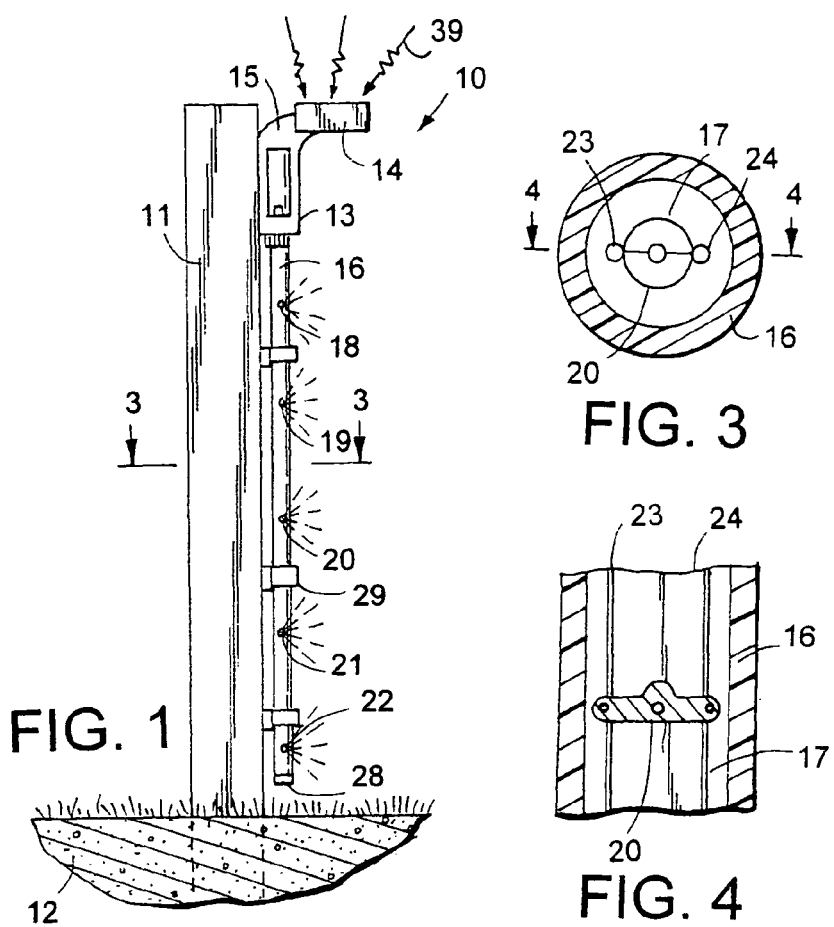
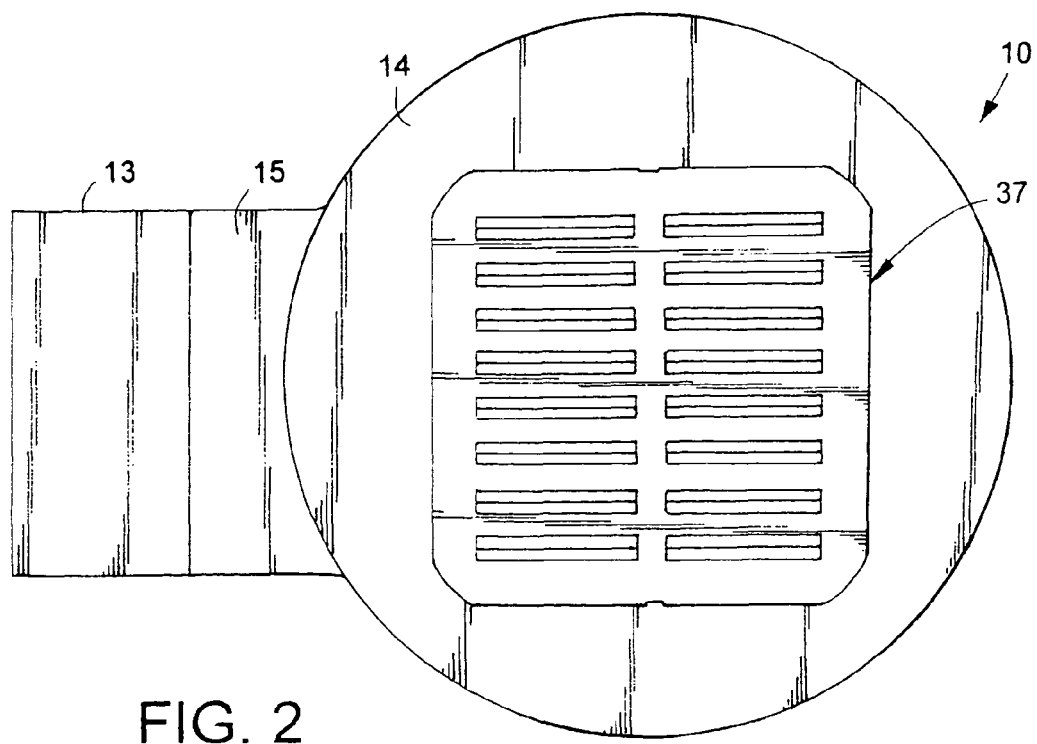

SOLAR POWER ILLUMINATOR

CROSS REFERENCE TO RELATED INVENTION

This application claims the priority of U.S. Provisional Patent Application Ser. No. 60/921,264 filed Apr. 2, 2007.

FIELD OF THE INVENTION

The invention relates to solar energy technology for charging a battery used to provide electric power to light emitting diodes, LED lamps. A solar panel uses sunlight to charge a battery for illuminating an environment.

BACKGROUND OF THE INVENTION

Outdoor light fixtures are used to illuminate and make lucid walkways, paths, doorways, plants and buildings. Convention electric power sources, such as AC 120 volt power, wired to the light fixtures energize the lamps associated with the fixtures. Switches, timers and photoresistors are included in the electric circuits of the lamps for turning on the lamps at night. The power sources include solar-powered rechargeable batteries that provide electric power to the lamps at night. Light emitting diodes lamps, LED lamps, are energy efficient as they emit relatively little heat and are low cost and durable light producing devices. LED lamps have been used with solar-powered rechargeable batteries to illuminate outdoor environments. Examples of solar panel light devices are disclosed in the following U.S. patents.

Janda et al in U.S. Pat. No. 5,086,267 discloses a control circuit for a solar powered rechargeable battery and a lamp. Switching circuitry reacts to a drop in output voltage of the solar panel, as ambient or sun light decreases, to connect the lamp to the battery. The switching circuitry also blocks the current to the lamp when the voltage of the panel is high as sunlight increases.

Arcadia et al in U.S. Pat. No. 5,564,816 discloses a solar panel 40 supported on an upright tubular member 20. A plurality of LEDs 72 connected a battery are located within the tubular member 20 adjacent the ornamental aperture 30.

Chen in U.S. Pat. No. 5,630,660, FIG. 6, discloses a plurality of illuminators 16 mounted on concave reflectors 17 and cemented to a solar panel 19. The illuminators can be LEDs.

Gross in U.S. Pat. No. 6,126,303 shows in FIG. 21 a solar powered energy source 276 coupled to a string of lights 264 located within an upright sleeve 216 having a hollow transparent tube 232. A plurality of LEDs 262 are located within the tube. An on-off switch 272 is used to connect the LEDs to the solar panel 276.

Patrick in U.S. Pat. No. 6,203,170 discloses a circuit board with LEDs 28 located within an upright housing 12. A solar panel 10 mounted on top of tube 12 is connected to the LEDs 28.

SUMMARY OF THE INVENTION

The invention is a solar powered illuminator for providing light to an outdoor environment in the absence of ambient light. The illuminator has a housing adapted to be mounted on a support. A platform joined to the housing supports a solar panel located in a position that exposes the solar panel to sunlight to provide a charging current for a rechargeable battery. A circuit board having electronic components and the battery are located on the housing and wired to the solar panel so that when the solar panel is exposed to sunlight, the charging current is directed to the battery. A light transparent member connected to the housing has an internal passage accommodating at least one LED lamp. Electrical conductors connect the LED lamp to the circuit board and battery so that when the solar panel is not exposed to sunlight the battery is disconnected from the solar panel and connected to the LED lamp whereby the LED lamp emits light which is transmitted through the member to the outside environment.

A preferred embodiment of the solar powered illuminator for providing light to an outdoor environment has an upright housing mountable on a support with releasable connectors. A horizontal cylindrical platform joined to the housing with a curved neck has a top wall supporting a solar panel. An elongated tubular member of translucent material with a continuous internal passage is connected to the housing and extends away from the housing. A plurality of spaced LED lamps located in the passage are electrically connected in series with electrical wires that lead to a circuit board and a battery. The housing has an internal chamber accommodating the circuit board, battery and electrical conductors coupled to the solar panel and LED lamps. The circuit board has electronic components that function to control the charging of the battery when the solar panel is exposed to sunlight and to disconnect the battery from the LED lamps. When the solar panel is not exposed to sunlight the battery is disconnected from the solar panel and connected to the LED lamps whereby the LED lamps emit light which is defused through the tubular member to the outside environment.

DESCRIPTION OF THE DRAWING

FIG. 1 is a side elevational view of the solar powered LED lamp apparatus mounted on an upright support;

FIG. 2 is an enlarged top plan view of the apparatus of FIG. 1;

FIG. 3 is an enlarged sectional view taken along line 3-3 of FIG. 1;

FIG. 4 is a sectional view taken along line 4-4 of FIG. 3;

DESCRIPTION OF THE INVENTION

Figure 5:
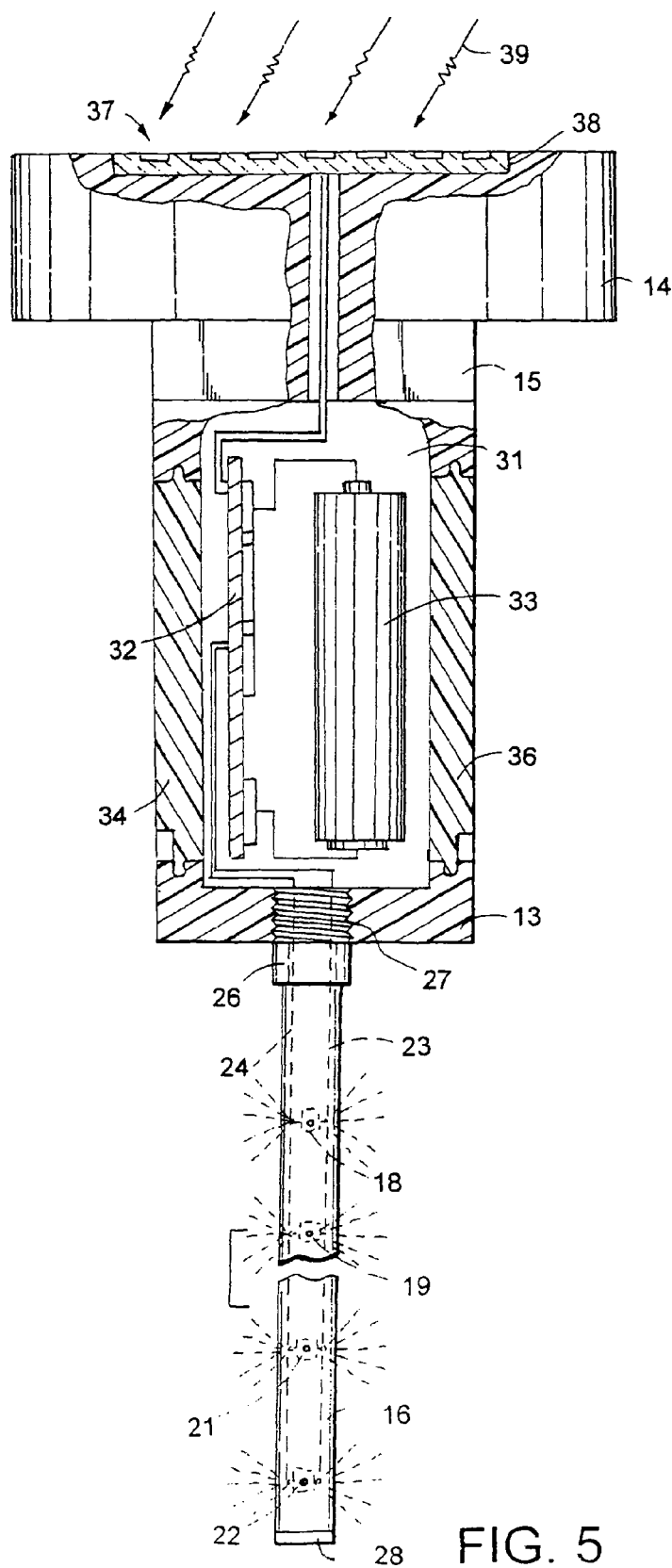
FIG. 5 is an enlarged front elevational view, partly sectioned of the apparatus of FIG. 1.

The solar powered illuminator of the invention is a light emitting diode or LED lamp apparatus 10, shown in FIG. 1, mounted on an upright structure 11, shown as a post anchored in ground 12. Other types of structures, including but not limited to buildings, walls, and fences, can be used to support apparatus 10. Apparatus 10 has an upright housing 13 joined to a horizontal cylindrical platform 14 with an upwardly and outwardly curved neck 15. Housing 13, platform 14 and neck 15 comprise a one-piece plastic body. Other materials, including metal and ceramic, can be used as the structure for the body. Housing 13, platform 14 and neck 15 can be separate ports secured together with fasteners, such as bolts and screws.

An elongated flexible tubular member 16 is secured to the bottom of housing 13 with a connector 26. As shown in FIG. 5, connector 26 is threaded into a hole 27 in the bottom of housing 13. Tubular member 16 has a continuous hollow passage 17 accommodating a plurality of LED lamps 18-22. Wire conductors 23 and 24 connect lamps 18-22 in series whereby substantially the same electric current is subjected to each LED lamp. Tubular member 16 is a translucent plastic tube that permits light to pass through the plastic and diffuses and expands the light emanating from LED lamps 18-22. Other types of light transferring materials can be used to enclose LED lamps 18-22 and wire conductors 23 and 24. Tubular member 16 can vary in length and in number of LED lamps. The space between adjacent LED lamps can vary. For example, adjacent LED lamps can be spaced 6 inches apart. A plug 28 inserted into the remote end of tubular member 16 seals passage 17 to prevent dirt and moisture from accumulating in passage 17. A plurality of brackets 29 attach tubular member 16 to post 11. The LED lamps 18-22 when connected to a DC battery emit light which is diffused through the tubular member 16.

As shown in FIG. 5, housing 13 has an internal chamber 31 accommodating a circuit board 32 and a rechargeable nickel cadmium battery 33 wired to circuit board 32. Circuit board 32 is wired to wire conductors 23 and 24 connected to LED lamps 18-22. The opposite sides of housing 13 has removable panels or doors 34 and 36 providing access to internal chamber 31 to allow removal of battery 33 and inserting a new battery. A pair of rechargeable batteries or a battery pack can be used to provide a source of DC power for LED lamps 18-22. The circuit board 32 is wired to a solar panel 37 located in a recess 38 in the top of platform 14. Solar panel 37 is a photovoltaic device that produces electric power when exposed to sunlight. Solar panel 37 is positioned in a horizontal location on platform 14 with the top of panel 37 exposed to ambient light. Platform 14 and solar panel 37 can be located at an angle facing the sun or equator to increase the total solar energy incident on the panel 37. An attachment agent, such as an adhesive, secures solar panel to platform 37.

Circuit board 32 has diode, transistor and electric resister components that control the charging of battery 33 by solar panel 37 and control the discharge of battery 33 into LED lamps 18-22 in response to a decreasing ambient light level detected by solar panel 37. Solar panel 37 when subjected to sunlight supplies a battery charging current through a diode and turns off electric power to LED lamps 18-22. Panel 37 will charge battery 33 when the voltage across panel 37 less the voltage drop across the diode is greater than the instantaneous voltage of battery 33. The diode prevents panel 37 from discharging battery 33 when panel 37 is in diminished light. Circuit board 32 connects battery 33 to LED lamps 18-22 when solar panel 37 is not subjected to sunlight whereby the LED lamps are energized and emit light to the outdoor environment. An examples of a central circuit for a solar powered rechargeable power source and a load is disclosed by R. W. Janda et al in U.S. Pat. No. 5,221,891.

Figure 6:
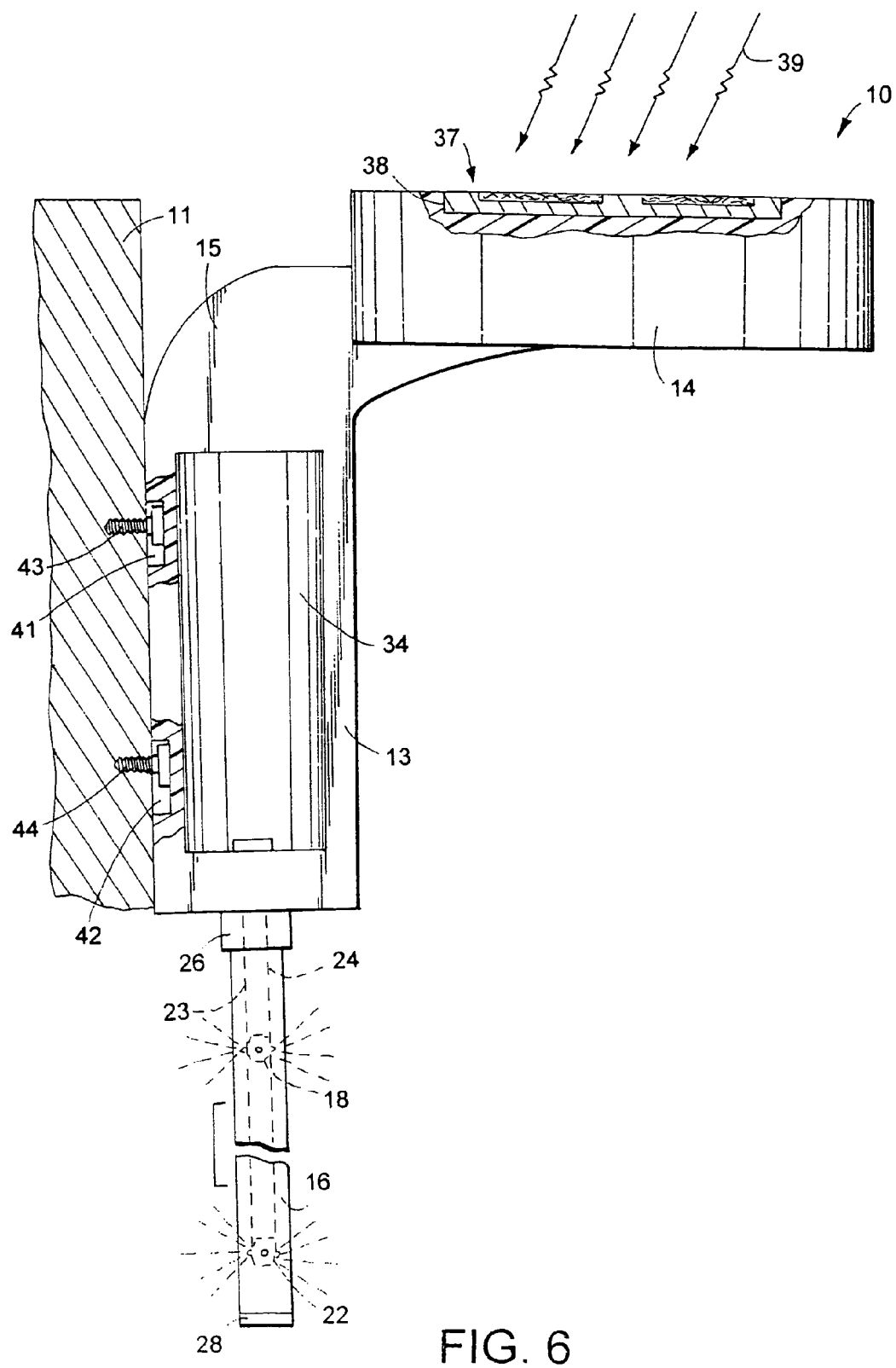
FIG. 6 is an enlarged side elevational view, partly sectioned, of the apparatus of FIG. 1.
Figure 7:
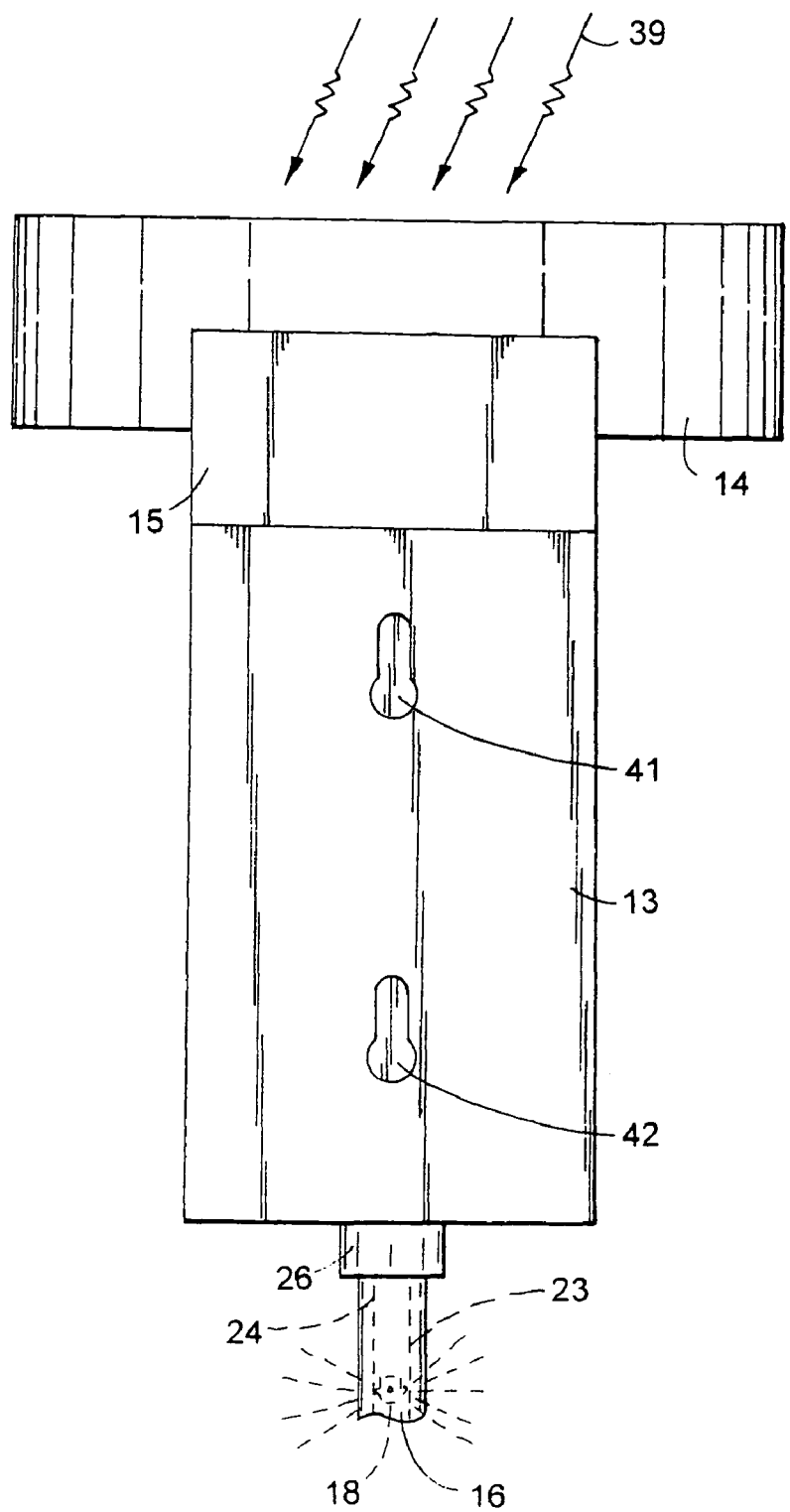
FIG. 7 is an enlarged rear elevational view of the apparatus of FIG. 1.

As shown in FIGS. 6 and 7, the back of housing 13 has vertically spaced keyhole slots 41 and 42 accommodating the heads of nails or screws 43 and 44 turned into post 11. Screws 43 and 44 retain housing 13 on post 11 and maintain platform 14 in a horizontal position to expose solar panel 37 to sunlight 39. Screws 43 and 44 associated with keyhole slots 41 and 43 are releasable connectors mounting solar powered LED light apparatus 10 on post 11. Other types of connectors can be used to mount solar powered LED light apparatus 10 on post 11 or support structures.

An example of solar powered LED light apparatus 10 has an upright rectangular plastic housing 13 joined with neck 15 to platform 14. Platform 14 is a disk having a one-inch thickness and a four-inch diameter. Solar panel 37 is a square panel having a plurality of light responsive elements wired to circuit board 32. A pair of Ni—Cd AA 1.2 volt batteries wired to circuit board 32 provides electric power to a number of LED lamps located within passage 17 of elongated linear plastic tubular member 16. Tubular member 16 is a translucent flexible polyethylene ⅜ diameter tube operable to enhance the luminance of the light emitted by the LED lamps 18-22. The LED lamps comprise 2.2 volt amber, white or red light emitting diodes connected in series with braided 22 gauge wire. The circuit board 32 has a power switching circuit operative to permit current to flow from the batteries through the LED lamps 18-22 responsive to a drop in output voltage of the solar panel 37 as ambient or sunlight decreases. The switching circuit also blocks the flow of current to LED lamps 17-22 when the voltage of solar panel 37 is high as sunlight increases.

The invention has been shown and described in relation to a preferred embodiment. Changes in the structures, arrangement of structure and the solar power control circuit can be made by persons skilled in the art without departing from the invention.

The invention claimed is:

1. A solar powered illuminator comprising: an upright housing having a bottom wall with an opening, a horizontal platform, a neck connecting the platform to the housing, an elongated tubular member of translucent material having a continuous internal passage, a connector located in the opening attaching the tubular member to the bottom wall of the housing at least one bracket for connecting the tubular member to a support, a plurality of spaced LED lamps located in said passage, said housing including an internal chamber and at least one removable panel closing an opening to said internal chamber providing access to said internal chamber, at least one battery located in said internal chamber, an electrical circuit board located in said internal chamber wired to said battery, first electrical conductors connected to the LED lamps in series and to said circuit board, a solar panel mounted on the platform and a second electrical conductor connecting the solar panel to the circuit board whereby when the solar panel is exposed to sunlight, it supplies a charging current to the battery and turns off the electric power to the LED lamps and when the solar panel is not exposed to sunlight the battery is disconnected from the solar panel and connected to the LED lamps whereby the LED lamps emit light which is defused through the tubular member to the outside environment.

2. The illuminator of claim 1 wherein: the tubular member is an elongated flexible plastic tube.

3. The illuminator of claim 1 wherein: said housing has two panels closing openings to said internal chamber, said panels being removable from the housing to provide access to said internal chamber and the battery therein.

4. The illuminator of claim 1 including: a pair of batteries locate in said chamber and conductors connecting the batteries to said circuit board.

5. The illuminator of claim 1 including: a recess in said platform, said solar panel being located in said recess, and an attachment agent securing the solar panel to the platform.

6. A solar powered illuminator comprising: a housing having a bottom wall with an opening, a platform, a first connector attaching the platform to the housing, an elongated tubular member of light transparent material having a continuous internal passage, second connector located in the opening attaching the tubular member to the wall of the housing, at least one bracket for connecting the tubular member to a support, a plurality of LED lamps located in said passage, said housing including an internal chamber and at least one panel closing an opening to said internal chamber, said panel when removed from the housing providing access to the internal chamber, at least one battery and an electrical circuit board located in the internal chamber, first electrical conductors connected to adjacent LED lamps in series and to said circuit board, second electrical conductors connecting the battery to the circuit board, a solar panel mounted on the platform and a third electrical conductor connecting the solar panel to the circuit board whereby when the solar panel is exposed to sunlight it supplies a charging current to the battery and turns off the electric power to the LED lamps and when the solar panel is not exposed to sunlight the battery is disconnected from the solar panel and connected to the LED lamps whereby the LED lamps emit light which is transmitted through the tubular member to the outside environment.

7. The illuminator of claim 6 wherein: the tubular member is an elongated flexible plastic tube.

8. The illuminator of claim 6 wherein: said housing has two panels closing openings to said internal chamber, said panels being removable from the housing to provide access to said internal chamber and the battery therein.

9. The illuminator of claim 6 including: a pair of batteries located in said chamber and conductors connecting the batteries to said circuit board.

10. The illuminator of claim 6 including: a recess in said platform, said solar panel being located in said recess, and an attachment agent securing the solar panel to the platform.

11. The illuminator of claim 6 wherein: the housing, platform and connector are a one-piece member.

12. The illuminator of claim 6 wherein: the housing includes means for attaching the housing to a support.

13. A solar powered illuminator comprising: a housing having an internal chamber and with a wall with an opening open to the chamber, a platform joined to the housing, an elongated flexible tubular member of light transparent material having an internal passage, a connector located in the opening attaching the tubular member to the wall of the housing, at least one bracket for connecting the tubular member to a support, at least one LED lamp located in said passage, at least one battery located in the chamber of the housing, an electrical circuit board wired to the battery located in the chamber of the housing, a solar panel mounted on the platform, and electrical conductors connecting the solar panel, the battery and LED lamp to the circuit board whereby when the solar panel is exposed to sunlight it supplies a charging current to the battery and turns off the electric power to the LED lamp and when the solar panel is not exposed to sunlight the battery is disconnected from the solar panel and connected to the LED lamp whereby the LED lamp emits light which is transmitted through the member to the outside environment.

14. The illuminator of claim 13 wherein: the tubular member is an elongated flexible plastic tube.

15. The illuminator of claim 13 wherein: said housing has two panels closing openings to said internal chamber, said panels being removable from the housing to provide access to said internal chamber and the battery therein.

16. The illuminator of claim 15 including: a pair of batteries located in said chamber and conductors connecting the batteries to said circuit board.

17. The illuminator of claim 13 including: a recess in said platform, said solar panel being located in said recess, and an attachment agent securing the solar panel to the platform.

18. The illuminator of claim 13 wherein: the housing includes means for attaching the housing to a support.

\* \* \* \* \*